(12) United States Patent
Rana et al.

(10) Patent No.: US 12,270,093 B2
(45) Date of Patent: Apr. 8, 2025

(54) METHOD OF HOT PRESS FORMING A STEEL ARTICLE AND STEEL ARTICLE

(71) Applicant: TATA STEEL IJMUIDEN B.V., JZ Velsen-Noord (NL)

(72) Inventors: Radhakanta Rana, Alkmaar (NL); Petrus Cornelis Jozef Beentjes, Castricum (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 482 days.

(21) Appl. No.: 17/780,477

(22) PCT Filed: Nov. 27, 2020

(86) PCT No.: PCT/EP2020/083809
§ 371 (c)(1),
(2) Date: May 26, 2022

(87) PCT Pub. No.: WO2021/105486
PCT Pub. Date: Jun. 3, 2021

(65) Prior Publication Data
US 2023/0002870 A1    Jan. 5, 2023

(30) Foreign Application Priority Data
Nov. 27, 2019  (EP) .................................... 19211953

(51) Int. Cl.
*C22C 38/06*  (2006.01)
*C21D 8/02*  (2006.01)
(Continued)

(52) U.S. Cl.
CPC .......... *C22C 38/06* (2013.01); *C21D 8/0226* (2013.01); *C21D 9/46* (2013.01); *C22C 38/04* (2013.01);
(Continued)

(58) Field of Classification Search
CPC .......... C21D 8/0226; C21D 9/46; C22C 38/06
See application file for complete search history.

(56) References Cited

U.S. PATENT DOCUMENTS

2016/0312323 A1   10/2016  Rana et al.

FOREIGN PATENT DOCUMENTS

| CA | 2880946 A1 * | 2/2014 | ............. B32B 15/01 |
| EP | 2708610 A1 | 3/2014 | |

(Continued)

OTHER PUBLICATIONS

Written Opinion and International Search of corresponding PCT Application No. PCT/EP2020/083809 mailed Dec. 21, 2020.
European patent application No. 18155866 filed Feb. 8, 2018.

*Primary Examiner* — Jessee R Roe
(74) *Attorney, Agent, or Firm* — Vorys, Sater, Seymour and Pease LLP; Anthony P. Venturino; Maryellen Feehery Hank

(57) ABSTRACT

Method of hot press forming an article from zinc or zinc alloy coated steel, wherein the steel is a product obtained by:
casting the molten steel into slabs;
reheating the slabs;
hot rolling the steel into a strip, preferably with an FRT above Ar3;
coiling the hot rolled steel strip;
pickling the hot rolled steel strip;
continuous annealing the strip;
hot dip coating the steel strip with the zinc or zinc alloy whilst:
using a dipping time of 3 seconds or more;
maintaining in the hot dip bath a bath temperature of 420° C. to 500° C.;
wherein the zinc bath contains essentially zinc, at least 0.1% Al, and optionally up to 5% Al and optionally up
(Continued)

Figure 1:
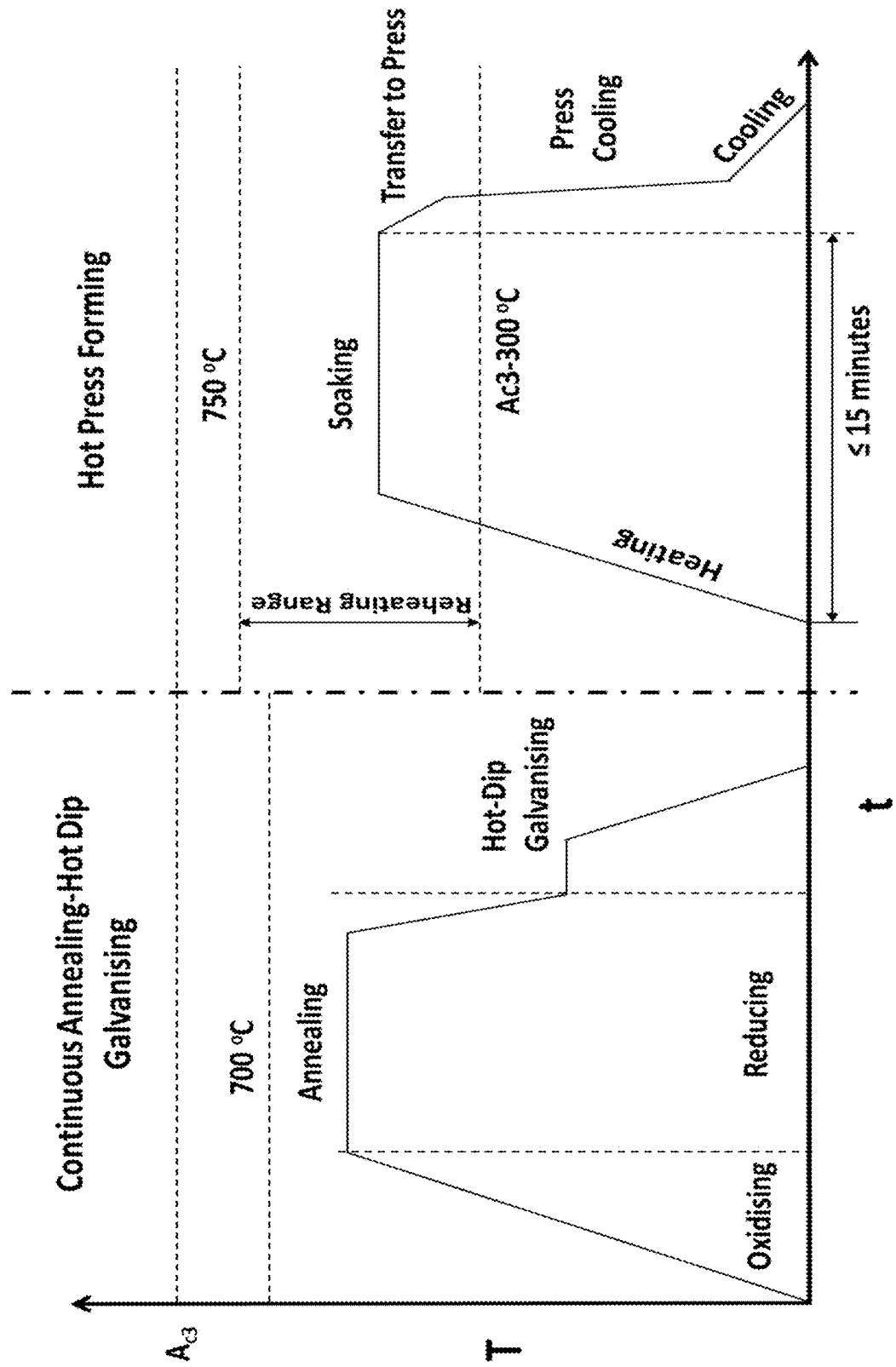

to 4% Mg, the rest of the bath including further elements all individually less than 0.3%, and unavoidable impurities;

hot press forming the article.

22 Claims, 2 Drawing Sheets

(51) Int. Cl.
| | |
|---|---|
| *C21D 9/46* | (2006.01) |
| *C22C 38/04* | (2006.01) |
| *C23C 2/06* | (2006.01) |
| *C23C 2/28* | (2006.01) |
| *C23C 2/40* | (2006.01) |
| *C23G 1/08* | (2006.01) |
| C22C 18/00 | (2006.01) |

(52) U.S. Cl.
CPC .................. *C23C 2/06* (2013.01); *C23C 2/28* (2013.01); *C23C 2/29* (2022.08); *C23C 2/40* (2013.01); *C23G 1/08* (2013.01); C21D 2211/001 (2013.01); C21D 2211/005 (2013.01); C21D 2211/008 (2013.01); C22C 18/00 (2013.01)

(56) References Cited

FOREIGN PATENT DOCUMENTS

| JP | 2014019905 A | 2/2014 |
|---|---|---|
| WO | 2018220430 A1 | 12/2018 |
| WO | 2019155014 A1 | 8/2019 |

\* cited by examiner

METHOD OF HOT PRESS FORMING A STEEL ARTICLE AND STEEL ARTICLE

The present invention relates to a method of hot press forming a steel article from a zinc or zinc alloy coated steel after continuous annealing and subsequently hot press forming a steel article from a zinc or zinc alloy coated steel and to a hot dip zinc or zinc alloy coated steel article manufactured by hot press forming a zinc or zinc alloy coated steel.

Hot press forming also known as hot stamping, hot forming, press stamping and press hardening is a technique to form and harden a steel blank into a shaped final article or part.

Generally, a steel blank is reheated to and soaked at austenitizing temperatures, typically in the range of 870-940° C., and then subsequently formed and press-quenched in the press dies. The high temperatures are required to fully austenitize the steel and dissolve all carbides. Press-quenching results in a strong martensite structure in the steel substrate. Even when hot forming is performed in the intercritical range in order to develop a dual phase structure, the reheating temperature is 760° C. or more.

It is known that hot forming of uncoated steel blanks results in oxidation. Zn and Al-based coatings have been applied to reduce this effect. In view of corrosion resistance Zn based coatings may be preferred as they offer also galvanic protection. However, due to the low melting temperatures of Zn and Zn—Fe compounds and the high reheating temperatures surface cracking may occur during hot forming, where cracking has been related to grain boundary penetration of zinc. One route to solving this problem that has been explored, is modification of the Zn coating.

Hot formed products of current (ultra-)high strength have a very low in-service ductility (<8%) due to their martensitic or martensitic-bainitic microstructure obtained by the press quenching. The martensitic microstructure in the hot formed products is aimed for mainly to deliver the required strength level (>1000 MPa). However, such a microstructure for the hot formed products can give a maximum total elongation of only about 6%. Although a single-phase martensitic microstructure can give a good bendability (e.g. >100° for 1000 MPa level and about 50° for 1500 MPa level), the crash energy absorption capacity in these products is low due to low total elongation. From US2016/0312323A1 inter alia a method of producing an ultrahigh strength uncoated steel is known. This known method comprises a step of providing a ferrous alloy comprising carbon and more than 2.5 wt. % manganese, a step of annealing the ferrous alloy at a first temperature to form an annealed alloy, hot forming the annealed alloy at a second temperature to form an intercritical or austenite structure and cooling the thus annealed austenitic alloy to form the ultrahigh strength steel. In an embodiment the annealed alloy is subjected to hot forming in an intercritical annealing temperature range. In another embodiment the hot forming temperature is at the austenitizing annealing range. The soaking time is between about 1 minute and about 10 minutes. In the Examples the thermal cycles of hot forming were simulated without inducing actual deformation, after a continuous annealing step of cold rolled sheets. It does not describe the method of continuous annealing and method of application of any coating on the steel strips. EP18155866 discloses a method of hot forming of a Zn or Zn alloy coated steel blank containing more than 3.1 wt. % Mn employing a soaking time up to only 3 minutes. It neither discloses the method of coating the steel strip with Zn or Zn alloy nor considers a soaking time beyond 3 minutes during reheating. A longer soaking time is preferred for steels containing relatively high amount of Mn for effective diffusion to take place.

An object of the present invention is to provide galvanic protection in relation to hot press formed steel strip articles offered by zinc-based coatings for (ultra-)high strength steels whilst reducing the risk of generating (micro-)cracks.

Another object of the invention is to provide a hot dip galvanizing process that makes coating of strips of steel containing high amounts of Mn by a Zn or Zn alloy possible, simultaneously giving a continuous annealing process that gives the desired microstructures for achieving high ductility in the final product.

Another object of the invention is to provide a hot press formed hot dip zinc or zinc alloy coated steel article of high strength and high deformability at room temperature.

Accordingly, the method according to the invention is a method of hot press forming a steel article from a zinc or zinc alloy coated steel strip, wherein the steel strip has a composition in wt. %:

C: 0.05-0.3;
Mn: 3.0-12.0;
Al: 0.04-3.0;
optionally one or more further alloying elements:
Si: less than 1.5;
Cr: less than 2.0;
V: less than 0.1;
Nb: less than 0.1;
Ti: less than 0.1;
Mo: less than 0.5;
inevitable impurities, such as
S: less than 30 ppm by weight;
P: less than 0.04;
the remainder being Fe;
the method of making the steel strip comprising the steps of:
casting the molten steel into a slab;
reheating the slab to a temperature above 1150° C. and holding it at said temperature for a time of 60 minutes or more;
hot rolling the steel into a strip, preferably with an exit finish hot rolling temperature FRT above the Ar3 temperature where Ar3 denotes the temperature at which ferrite transformation begins in the steel during cooling;
coiling the hot rolled steel strip;
pickling the hot rolled steel strip;
optionally cold rolling the pickled hot rolled steel strip into a cold rolled steel strip wherein in the case of cold rolling, the hot rolled strip after coiling and pickling is subjected to batch annealing at a temperature TB for a period PB, TB and PB being chosen such that the steel has a microstructure exhibiting more than 60 vol. % ferrite after cooling to room temperature, wherein in a preferred embodiment TB and PB are chosen as TB is 650° C. or lower and PB is 24 hours or longer;
continuous annealing the strip according to an annealing heat cycle wherein the steel strip temperature is going up preferably at a rate of 1-15° C./s in the heating section, is then remaining at a relatively stable level for soaking in a soaking section wherein a soaking atmosphere is maintained, at a temperature between TMIN and TMAX wherein TMIN=TMAX−100° C., wherein continuous annealing is considered to end at the point in the heating cycle where the steel strip temperature goes down, preferably at a rate of 0.5-10° C./s:

wherein TMAX is equal to or less than the lowest of Ac3-100° C. and 700° C.;

wherein the soaking atmosphere has a dew point of −40 to −10° C.;

wherein the continuous annealing comprises in the heating section pre-oxidizing the steel strip in an annealing atmosphere having an oxygen content of 500 to 3000 volume ppm;

wherein the soaking atmosphere is a reducing atmosphere, containing preferably between 1-15 vol. % Hydrogen in Nitrogen;

wherein the continuous annealing time, which consists of the time in the heating section plus the time in the soaking section is 150 seconds or more, preferably 180 seconds or more;

hot dip coating the steel strip with the zinc or zinc alloy whilst:

using a dipping time of 3 seconds or more;

maintaining in the hot dip bath a bath temperature of 420° C. to 500° C.;

wherein the zinc bath contains essentially zinc, at least 0.1 wt. % Al, and optionally up to 5 wt. % Al and optionally up to 4 wt. % Mg, the rest of the bath comprising further elements all individually less than 0.3 wt. %, and unavoidable impurities;

hot press forming the article, comprising the steps of:

providing a blank taken from the hot dip zinc or zinc alloy coated steel strip;

reheating the blank to a blank temperature TRH in the range of Ac3-300° C. to 750° C., soaking the blank at TRH for a period of longer than 3 minutes and up to 15 minutes;

transferring the blank to the press within 30 seconds;

shaping the article in the press, thereby cooling the article;

removing the article from the press.

A steel with the specified composition is processed to hot-rolled strips or cold-rolled strips by using the specific manufacturing process. Then, the strips are continuous annealed using the temperature and duration of treatment as well as dew point and atmospheres in different sections of the process such that the surface enrichment of alloying elements of the steel is prevented giving a surface suitable for good adhesion of Zn or Zn alloy coating to the steel substrate by hot dip galvanizing. The specified continuous annealing process takes place at a low intercritical temperature at or below the lowest of Ac3-100° C. or 700° C. so that Mn-partitioning between ferrite and austenite phase of the steel will take place which will enable the forming of the desired microstructure with high amounts of retained austenite after hot press forming. Then, the Zn or Zn alloy coated steel strips in the form of blanks are reheated in the same intercritical temperature region (from Ac3-300° C. to 750° C. preferably to 700° C.) longer than 3 minutes so that effective Mn partitioning between ferrite and austenite can occur again. The temperature of reheating of the blanks is chosen in such a way that grain boundary penetration of liquid Zn or Zn alloy does not take place, minimizing the surface micro-cracks during hot forming of the steel article. Preferably, in the hot dip zinc or zinc alloy coated hot press formed steel comprising of the steel substrate provided with the hot dip coated layer, the length of any micro-cracks in the steel substrate is 5 µm or smaller.

For a steel containing Mn in the range of 3 to 12 wt. %, conventionally denoted as "a medium Mn steel" a good, adherent coating of a Zn or Zn alloy can be applied on the strip surfaces by hot dip galvanizing.

Just before hot dipping the steel into the bath of a Zn or Zn alloy, the steel is subjected to continuous annealing at an intercritical temperature allowing effective partitioning of Mn between ferrite and austenite phases of the steel. This feature assists Mn partitioning during subsequent reheating of the Zn or Zn alloy coated steel for hot press forming to give the desired final microstructure with high amounts of retained austenite.

The reheating of the Zn or Zn alloy coated steel blanks to a temperature in the temperature range from Ac3-300° C. to 750° C. preferably to 700° C. minimises the formation of liquid Zn or Zn alloy and penetration thereof into the grain boundaries of the steel substrate for reheating durations of equal to or more than 3 minutes.

The above reheating selected from the intercritical temperature range of the steel also ensures that the Mn pre-partitioning that occurred during preceding continuous annealing between ferrite and austenite occurs further. A reheating time longer than 3 minutes causes more effective partitioning of Mn so that the thermal stability of the austenite phase becomes high and high fractions of retained austenite are obtained after cooling the article to room temperature.

In an embodiment of the method the Mn content of the steel is 6.0 wt. % or more. This achieves the effect that the Ac3 temperature of the steel is substantially suppressed, as explained later. As a result, lesser formation of Zn-rich liquid phase takes place during reheating of the blanks and hot-press forming. This suppresses the zinc-induced liquid metal embrittlement minimising the microcracking in the hot-formed articles. Furthermore, enabling a lower required reheating temperature by this preferred embodiment also saves energy costs during hot press forming and causes less oxidation of the zinc coating on the steel surface. Thereby, the weldability of the hot-formed articles improves and the necessity for sand blasting the articles after hot forming is eliminated.

In an embodiment of the method the slab is reheated to a temperature above 1200° C. or preferably above 1250° C. and held at said temperature for a time of 60 minutes or more. This achieves the effect that the Mn is homogeneously distributed in the as-cast steel slabs.

In a further embodiment of the method the slab is reheated to a temperature and held at said temperature for a time period of 120 minutes or more. This achieves the effect that the Mn gets even more homogeneous distribution in the as-cast steel slabs minimising any micro-segregation.

In another embodiment of the method TRH is in the range of Ac3-300° C. to 700° C. This achieves the effect that minimum amounts of zinc-rich liquid phase forms on the steel surface reducing the chances of the penetration of the liquid phase into the steel substrate, thereby further minimising or eliminating the zinc-induced liquid metal embrittlement and microcracking phenomenon.

In still another embodiment of the method transferring the blank to the press is within 10-15 seconds. This achieves the effect that the temperature loss of the steel blank is minimised so that the articles can be shaped more easily and the springback in the shaped article can be minimised or eliminated.

The invention is also embodied in a Hot dip zinc or zinc alloy coated hot press formed steel article obtainable by the method of any of claims 1 to 5, having a microstructure comprising in vol. % ferrite: 30% or more, preferably 40% or more;

retained austenite: 20% or more, preferably 30% or more;

martensite: 40% or less, preferably 30% or less, including 0%.

With such a microstructure of the steel article containing 20 vol. % or more, preferably 30 vol. % or more retained austenite in combination with the given amounts of ferrite and martensite, the ductility as expressed by total elongation and bendability are achieved at high levels. These microstructures also ensure that high strength values are achieved in the article, particularly due to the retained austenite which transforms to strong martensite during cold deformation such as in a crash and due to any initial martensite present in the microstructure of the article.

In an aspect according to the invention, the hot dip zinc or zinc alloy coated hot press formed steel article has the following mechanical properties: yield strength ≥800 MPa, ultimate tensile strength ≥820 MPa, total elongation ≥10%, bending angle at 1 mm thickness ≥80°. Such an article is in particular suitable for automotive applications e.g. front or rear longitudinal bars, lower portion of a B-pillar, bumper beams, etc. Due to the high mechanical properties (i.e. total elongation, bendability and strength values), a high crash energy absorption can be achieved in the article.

The invention is based on modification of the composition of the steel substrate that is provided with a zinc or zinc alloy based coating, design of the processing route so that the steel can be manufactured into the cold-rolled and/or hot-rolled form, design of the continuous annealing and hot dip galvanizing process that will render the steel suitable for coating by Zn or a Zn alloy and cause favourable microstructural changes in the steel substrate for subsequent hot stamping as well as the design of the hot stamping process. The essential elements for the modification of the steel substrate are Mn, C and Al. With increasing Mn content in steel, the austenite transformation temperatures, both where austenite transformation starts (Ac1) and completes (Ac3) on heating, are lowered. This enables annealing of the steel at lower temperatures in the intercritical phase field of the steel.

This suppression of austenite transformation temperatures comprises the following advantages:
  Due to low soak temperature diffusion of alloy elements and subsequent external selective oxidation of the alloying elements is reduced. It should be mentioned that because of elevated Mn content of the steel substrate, there is a larger potential for external selective oxidation of Mn which would hamper wettability by liquid zinc.
  The reheating of the Zn or Zn alloy coated steel blanks can also be done at a relatively low temperature, thus minimizing growth of a thick oxide, i.e.: more metallic zinc remains.
  The hot press forming temperature is lowered as well. This minimizes formation of liquid zinc and its penetration to the grain boundaries, and micro cracking by zinc is strongly reduced.

The steel substrate is annealed and reheated at its intercritical temperature range to achieve the desired microstructure components to guarantee the high mechanical properties. This metallurgical requirement also contributes to the invention. If the steel is annealed and/or reheated for hot forming above Ac3 temperature i.e. in the austenitic temperature, the desired microstructure cannot be achieved. If these heat treatments would be done above Ac3 temperature of the steel, then a single phase of austenite would be present at the soaking temperatures and the composition of this austenite would assume the bulk composition of the steel which has low thermal stability. On the other hand, when the soaking takes place at an intercritical annealing temperature, two phases of austenite and ferrite co-exist at the soaking temperature. This allows partitioning of alloying elements between austenite and ferrite. The steel of this invention contains Mn, C and Al as essential alloying elements. Therefore, Mn and C will partition more into austenite as they are gamma-genic elements and Al more to ferrite as it is an alpha-genic element. Also, a low heat treatment temperature ensures that the grain size of the steel remains fine. Due to low intercritical heat treatments, an ultrafine microstructure (≤2 μm grain size) is obtained which improves the strength and ductility of the product.

Here lies the other importance of the modification of the steel. The elevated amount of Mn of the steel, in the range of 3 to 12 wt. %, will cause high Mn enrichment in austenite by the partitioning process during annealing and reheating at the intercritical temperature range. This Mn enrichment, together with carbon enrichment, increases the thermal stability of the intercritical austenite. Therefore, during cooling or quenching to room temperature the intercritical austenite does not transform to martensite or any other phase to a great extent so that a high amount of austenite (>20 vol. %) can be retained in the microstructure of the steel at room temperature. The retained austenite during loading transforms to martensite causing a transformation induced plasticity (TRIP) effect. High strength, high elongation and high bendability are achieved in the product because of the TRIP effect that increases the work or strain hardening rate. A Mn content higher than 12 wt. % will cause continuous casting of the steel to be difficult due to extreme segregation as well as the mechanism of plasticity enhancement will change from TRIP to TWIP (twinning induced plasticity), and a content lower than 3 wt. % will not give enough Mn enrichment in austenite to achieve sufficient amounts of retained austenite at room temperature.

Similar to the effects of Mn as described above, C also enriches in intercritical austenite, increases the thermal stability of austenite and causes austenite stabilisation at room temperature microstructure. However, C is effective in smaller amounts than Mn and therefore the range of C content for modifying the steel chemistry in the present invention is 0.05 to 0.3 wt. %. If the C content is below 0.05 wt. %, sufficient austenite stabilisation effect is not obtained, and a C content above 0.3 will cause post processing the manufactured article such as spot welding difficult. Welding is an essential step in assembling the automotive components into the autobody and therefore a very important aspect to consider. C is also added to the steel in the present invention to increase the strength.

Aluminium is not an austenite stabilizing element in steel, rather a ferrite stabilizing element. However, it is added to the steel 0.04-3 wt. % to enlarge the intercritical temperature range (Ac1 to Ac3) of the steel. With high level of Mn, the steel becomes sensitive to small variations in processing temperature and the resulting microstructure may change giving variable mechanical properties. Addition of Al ensures the process robustness of the steel so that the annealing and reheating temperatures of the steel can be selected with small variations to achieve desired mechanical properties. When no Al, apart from a minimum level required for deoxidation of steel (i.e. <0.04 wt. %), exists in the steel, more accurate furnaces are necessary to be employed but still the invention will work. The highest amount of Al is limited to 3 wt. % to reduce oxide scale formation during hot rolling and the rolling forces during hot and cold rolling.

To manufacture the steel into hot and/or cold rolled strips, unique processing steps must be employed in this invention since the steel contains relatively high amounts of alloying elements, particularly Mn. Mn has a tendency to segregate after casting when its content goes beyond about 2 wt. %. This will hamper the product performance by giving inhomogeneous properties and can also lead to cracking. Therefore, it is necessary that the cast slabs are homogenised well. It is achieved by subjecting the slabs to relatively high temperatures, above 1150° C., preferably above 1200° C., and for a long enough time, preferably for 60 minutes or more.

Then, due to high alloying, the rolling forces are high during hot-rolling of the strips. Hot-rolling of the steel is made possible by using a relatively high temperature hot rolling in the austenitic temperature range. The finish rolling temperature (FRT) is maintained well above the Ar3 temperature, which may lie above 900° C., to keep the required hot-rolling forces relatively low.

Further, when optionally cold-rolling is applied on the hot-rolled strips to reduce the gauge of the final steel product, it will not be possible to cold-roll the material unless a proper pre-processing is adopted. In particular, the as-coiled steel after hot-rolling is subjected to a batch annealing treatment preferably for 24 hours or longer at a temperature low in the intercritical temperature range of the steel. This batch annealing temperature should preferably be lower than 650° C. because at a temperature higher than this high amounts of retained austenite will form after cooling the steel to room temperature. Also, high amounts of martensite may appear in the microstructure if a high batch annealing temperature is used. Both the martensite and retained austenite make cold-rolling difficult by increasing the rolling force. While the martensite phase is hard, the retained austenite transforms to hard martensite during cold-rolling itself increasing the rolling force. Therefore, a batch annealing of the as-coiled material is desirable to keep the contents of retained austenite and martensite to a lower value and increase the amount of ferrite. The ferrite phase does not give work hardening during cold rolling as high as retained austenite and therefore keeps the rolling force low, making cold rolling possible.

Next during the processing of the steel, the invention requires design of the continuous annealing process in such a manner that during continuous annealing the steel surface remains clean and free from oxides to make it amenable to the subsequent hot dip galvanizing step. The continuous annealing and hot dip galvanizing steps of the present invention are shown schematically in the left-hand side of FIG. 1. The challenge lies in the fact that in addition to creating a steel surface that is amenable to good Zn or Zn alloy adhesion the continuous annealing treatment must also deliver a steel substrate microstructure where sufficient partitioning of Mn and C between ferrite and austenite takes place leading to a high retained austenite fraction in the substrate prior to reheating during hot press forming. To achieve both requirements, the maximum soaking temperature, TMAX during continuous annealing is kept lower than lowest of Ac3-100° C. and 700° C. This temperature lies in the intercritical temperature range of the steel optimised to get maximum Mn partitioning to austenite. A temperature above 700° C. irrespective of the steel chemistries of this invention will lead to severe external selective oxidation of the steel surface. Sufficient Mn partitioning to austenite from ferrite is ensured by a soaking time of at least 150 s, preferably more than 180 s. A shorter soaking time will not lead to sufficient Mn enrichment in austenite to give it sufficient thermal stability since Mn is a relatively large substitutional alloying element in steel which is slow to diffuse. Carbon, on the other hand, being a small interstitial alloying element in steel, can diffuse faster than Mn. Therefore, the requirement of a minimum soaking time is demanded mainly from Mn diffusivity point of view rather than that of C. A heating rate in the range of 1 to 15° C./s to the soaking temperature is preferred. A slower heating rate will make the production of continuous annealing economically less attractive, and a faster rate will make the operation of the continuous annealing line extremely risky and therefore impractical.

Apart from maintaining the above-described low soaking temperature during continuous annealing, the annealing atmosphere must also be controlled in order to render the surface of the steel substrate amenable to good adhesion of Zn or Zn alloy during hot dip galvanizing. Thus, the annealing atmosphere during the heating of the steel strip to the soaking temperature is maintained oxidizing, typically with oxygen contents between 500 to 3000 ppm by weight in the annealing atmosphere. Due to this pre-oxidizing atmosphere, internal selective oxidation takes place and a thin layer of Wustite is formed. Then, during soaking of the steel substrate at the annealing temperature a reducing atmosphere is maintained containing preferably 1 to 15 vol. % $H_2$ in the annealing atmosphere. Due to the reducing atmosphere during soaking, Wustite is reduced. At the soaking temperature of this application, the diffusion rate of alloy elements is low, and therefore enrichment of the alloy elements is sluggish. An oxygen content below 500 wt. ppm during heating would allow Mn, Si atoms to be oxidized on the steel surface, eventually leading to poor wetting of liquid zinc. On the contrary, an oxygen content above 3000 wt. ppm will cause excessive oxidation of Fe leading to formation of a thick FeO layer on the steel surface. This surface is not amenable to Zn or Zn alloy adhesion. Furthermore, these FeO particles can be picked up on the rolls in the production process giving numerous surface defects.

After it is ensured during continuous annealing that the surface of the steel substrate is free from enrichment of the alloying elements as described above, the steel strip is dipped into the bath containing liquid Zn or Zn alloy maintained between temperatures of 420° C. and 500° C. Below a bath temperature of 420° C., the Zn will remain solid and above 500° C., excessive vaporisation of liquid Zn or Zn alloy will take place. The typical temperature optimised for viscosity of the liquid and its vaporisation is in the range of 450-465° C. Furthermore, the duration of dipping of the steel strip in the Zn or Zn alloy liquid bath is also important. The duration is determined by the speed at which the steel strip passes through the continuous annealing line. The line speed in the continuous annealing facility should be adjusted in such a way that a minimum of 3 s duration of dipping of the steel strip in the galvanizing bath is ensured. The time of 3 s or more is necessary in order to obtain a good adhesion between the steel strip and the Zn or Zn alloy.

The above hot dip galvanizing conditions are applicable to a Zn bath containing essentially zinc, at least 0.1 wt. % Al, and optionally up to 5 wt. % Al and up to 4 wt. % Mg, the rest of the bath comprising further elements all individually less than 0.3 wt. %, and unavoidable impurities. Thus, the invention is not limited to only a pure Zn coating, but it is applicable to a wide range of variants of Zn-based coatings.

The current invention pertaining to hot press forming of a steel substrate and its processing to the coated strip works in tandem with the hot forming process which is also a part of the invention. The hot forming cycle is shown schematically in the right-hand side of FIG. 1. According to the invention for hot pressing of Zn or Zn alloy coated steel strip or blank it must be reheated at a low temperature in the intercritical temperature region of the specially designed steel substrate. The typical temperature range of reheating, TRH is from Ac3-300° C. to 750° C., preferably to 700° C. The selection of this temperature range is based on several considerations:

There is no need for full austenitization;

The hot formed components of this invention do not need sand blasting to remove the Zn-oxides before welding as is done for conventionally hot formed steels, since the zinc oxide present after heat treatment is still very thin. This reduces manufacturing cost of the hot formed parts by eliminating the cost of sand blasting and improving the spot weldability;

The essential features of microstructure of the steel substrate of this invention does not change significantly during the hot press forming process. Therefore, the press temperature can be lower than in case of conventional hot press forming. That way, metal embrittlement by zinc can be minimized. When the micro-cracks formation is minimised during hot forming, the product achieves high fatigue resistance and durability.

Due to the above low temperature reheating, the oxidation of the Zn or Zn alloy coating is also minimised and the metallic coating remains relatively thick which gives good galvanic protection to the steel substrate in performance thereby increasing the corrosion resistance of the product;

The above benefits due to selection of the low reheating temperature during hot forming are related to the Zn or Zn alloy coating on the steel substrate. This selection of the blank reheating temperature is also for contribution to the development of the right microstructure in the steel substrate to achieve the desired mechanical properties and finally the mechanical performance. As described previously, the substrate during the preceding continuous annealing step already formed a substantial amount of retained austenite due to selection of the soaking temperature in the intercritical temperature range of the steel substrate. The intercritical reheating for hot forming adds on to this by further facilitating partitioning of Mn and C into austenite so that retained austenite of higher mechanical stability can be obtained in the hot formed steel substrate. The reheating step will also create an additional amount of retained austenite because of the additional opportunity for the austenite stabilizing elements to diffuse into intercritical austenite.

The blank thus reheated is transferred to a shaping tool for deformation, typically a press, wherein the blank is deformed to a desired shape. The transfer time is preferably within 30 s, more preferably within 10-15 s in order to avoid excessive cooling of the blank. Subsequent to shaping in the press, the article is cooled. Press quenching as is essential in traditional hot forming is not necessary in the present invention as the intercritical austenite with high amount of Mn is very stable, and when it transforms to martensite partially, it has very high hardenability making higher rate press quenching unnecessary. The shaped article may be removed from the press and allowed to cool in ambient atmosphere. Forced cooling with air or combined press quenching followed by (forced) cooling in air is also possible.

The reheated blank is transferred from the furnace or other heating equipment to the shaping tool for deforming. As said, preferably the transfer time is short, preferably within 10-15 seconds. In an advantageous embodiment the temperature drop of the steel blank during transfer does not exceed 150° C. Preferably the temperature drop is in the range of 100-150° C. If the temperature drop is higher, then the blank might be too strong to deform in the subsequent shaping step.

Furthermore, the present invention allows the shaped article to be taken out from the hot forming press just after shaping, e.g. at an exit temperature in the range of 100-450° C., such as 200-425° C., because press quenching is not strictly necessary.

In an embodiment this cooling step is performed in the press, advantageously to a temperature in the range of 100-250° C., preferably in the range of 150-200° C. A cooling rate of at least 3° C./s is suitable in view of hardenability of the modified steel substrate. Even this relatively slow cooling rate will ensure that austenite is again transformed to martensite in the shaped article. Advantageously the quenching rate is at least 5° C./s. After removal from the press the shaped article is allowed to cool further down to ambient temperature.

The key to achieving the mechanical properties in the invention is the above-described process chain of the modified steel substrate chemistry leading to the unique microstructure in the final hot formed condition. The modified steel chemistry with the inventive processing leads to at least 20 vol. % of retained austenite and at least 30 vol. % of ferrite whilst martensite is 40 vol. % or less, including 0 vol. %. This relatively high fraction of retained austenite is metastable and gives the TRIP effect to achieve a high combination of strength, elongation and bendability leading to high crashworthiness of the hot formed hot dip zinc or zinc alloy coated steel article. Even when the retained austenite is relatively stable, its inherent higher ductility than ferrite and martensite due to its face centred cubic (FCC) crystal structure gives high ductility values.

The steel that is used in the method according to the invention is an inventive steel concept that comprises as main constituents carbon, manganese and aluminium. Optionally other alloying elements selected from silicon, chromium, vanadium, niobium, titanium and molybdenum may be present. Inevitable impurities like N, P, S, O, Cu, Ni, Sn, Sb etc. (originating from the starting materials for preparing the steel composition) may be present but in very low concentration. They are not added on purpose or specifically controlled within predetermined limits. The balance of the steel composition is iron.

Carbon is present in an amount of 0.05-0.3 wt. %, preferably 0.05-0.25 wt. %, more preferably 0.08-0.2 wt. %. It is added mainly in view of strength, although carbon also contributes to stabilizing austenite. In the present composition the austenite stabilizing effect of manganese is much more pronounced due to its higher proportion. Too little C will not give the desired strength level of 820 MPa or more, and preferably 1000 MPa or more, and if C is higher than 0.3, weldability of the formed parts might become poor.

Manganese is present in an amount of 3.0-12.0 wt. %. Manganese lowers the Ac1 and Ac3 temperatures, stabilizes austenite, increases strength and toughness, and causes the TRIP effect by stabilizing austenite at room temperature microstructure. At levels below 3.0 wt. % the effects aimed for are not achieved, while at amounts above 12.0 wt. % problems in casting and segregation will be caused. Also, the deformation mechanism would change from transformation induced plasticity (TRIP) to twinning induced plasticity (TWIP). If the Mn content is too low, then insufficient austenite will be retained at room temperature and the stability of the retained austenite will be too low with the result that no ductility benefit can be obtained. Preferably the Mn content is in the range of 3.5-10.5 wt. %. In an embodiment Mn amounts to 5.0-9.0 wt. %. In other embodiments it is 5.5-8.5 wt. %, such as 6.0-7.5 wt. %.

Aluminium may be added to expand the temperature range Ac1-Ac3 to increase the robustness of the process in view of industrial application. Al is present in an amount of 0.04-3.0 wt. %, preferably 0.5-2.5, more preferably in the range of 1.0-2.2.

Silicon, if present, is added in an amount of less than 1.5 for increasing strength by solid solution strengthening. If present, the amount is typically more than 0.01 wt. % and less than 1.5 wt. %. Its preferred range is 0.1-1.0 wt. %.

Al and Si contribute both to suppress cementite precipitation to avoid deterioration of ductility. Furthermore, both Al and Si also increase the peak annealing temperature for obtaining the highest amount of retained austenite at room temperature. Therefore, during intercritical annealing the diffusion of Mn is facilitated to have effective Mn partitioning in austenite.

One or more further micro-alloying elements, selected from the group V, Nb, Ti and Mo, are optionally present. These micro-alloying elements increase the strength through precipitation hardening by their carbides, nitrides or carbonitrides. Cr, another optional element for this invention, also increases the peak annealing temperature for achieving highest amount of retained austenite at room temperature and reduces the sensitivity of the content of retained austenite with annealing temperature. These result in effective Mn partitioning in austenite and increased process robustness during annealing. If present, the preferred additions of these optional alloying elements are: V: 0.01-0.1 wt. %; and/or Nb: 0.01-0.1 wt. %; and/or Ti: 0.01-0.1 wt. %; and/or Mo: 0.05-0.5 wt. %; and/or Cr: 0.1-2.0 wt. %.

The composition of the zinc or zinc alloy coating is not limited. Hot dip coating may be performed using a standard GI coating bath, wherein GI stands for "normal galvanizing, i.e. hot dip coating using a bath with mainly zinc". Several Zn coating baths may be applied, such as zinc baths containing essentially zinc, at least 0.1 wt. % Al, and optionally up to 5 wt. % Al and optionally up to 4 wt. % Mg, the rest of the bath comprising further elements all individually less than 0.3 wt. %, and unavoidable impurities. A zinc alloy coating layer may be realised comprising 0.3-4.0 wt. % Mg and 0.05-6.0 wt. % Al and optionally at most 0.2 wt. % of one or more additional elements along with unavoidable impurities and the remainder being zinc. Additional elements that may be present in a small amount of less than 0.3 wt. %, e.g. in order to form spangles and/or to prevent dross forming, could be selected from the group comprising Pb, Sb, Ti, Ca, Mn, Sn, La, Ce, Cr, Ni, Zr and Bi. Pb, Sn, Bi and Sb. Small amounts of such additional elements do not alter the properties of the bath or the resulting coating to any significant extent for the usual applications. Preferably, when one or more additional elements are present in the coating, each is present in an amount <0.02 wt. %, preferably each is present in an amount <0.01 wt. %.

The obtained Hot dip zinc or zinc alloy coated hot press formed steel article preferably has a triplex or duplex microstructure comprising (in vol. %):
 ferrite: 30% or more, preferably 40% or more;
 retained austenite: 20% or more, preferably 30% or more
 martensite: 40% or less including 0%, preferably 30% or less including 0%.

Advantageously the resulting shaped article has the following properties:
 yield strength: 800 MPa or more; preferably 850 MPa or more, more preferably 900 MPa or more
 tensile strength: 820 MPa or more; preferably 1000 MPa or more
 total elongation: 10% or more; preferably 15% or more, more preferably 25% or more;
 minimum bending angle at 1.0 mm thickness: 80° or more; preferably 90° or more.

The phase fractions mentioned above were determined by using X-ray diffraction (XRD). The amount of retained austenite was determined by XRD at ¼ thickness location of the samples. The XRD patterns were recorded in the range of 45 to 165° (2 Θ) on a Panalytical Xpert PRO standard powder diffractometer ($CoK_\alpha$-radiation). Quantitative determination of phase proportions was performed by Rietveld analysis using Bruker Topas software package for Rietveld refinement. Martensite content was determined from the peak-split at the ferrite diffraction locations in the diffractograms. The grain size of the phases can be determined from scanning electron microscope images of the microstructure.

The yield strength, ultimate tensile strength and total elongation were determined from quasistatic (strain rate $3\times10^{-4}$ $s^{-1}$) tensile tests at room temperature according to NEN10002 standard. The geometry of the tensile specimens consisted in 50 mm gauge length in the rolling direction, 20 mm width and a nominal thickness of 1.5 mm. The bendability was determined by three-point bending tests following VDA 238-100 standard on nominally 1.5 mm thick, 40 mm×30 mm specimens in both longitudinal and transverse directions. The bending axis was along the 30 mm dimension and the bending radius was 0.4 mm. The bending angles obtained from the nominally 1.5 mm specimens were converted to the angles corresponding to 1.0 mm thickness using the following formula: bending angle at 1.0 mm thickness=measured angle×square root of actual thickness in mm. From these converted bending angles, for a specific heat treatment condition the lowest value of the longitudinal and the transverse specimens was taken to claim the ranges in this invention.

By using an intercritical continuous annealing step in manufacturing the steel strip as explained above before reheating the blanks cut from the strip, Mn partitioning from ferrite to austenite occurs making the intercritical austenite even more stable. During cooling after intercritical annealing via the hot dip galvanizing the intercritical austenite does not transform significantly to martensite because of its high stability and due to the low Ms (i.e. high thermal stability), giving a triplex (ferrite+retained austenite+martensite) or duplex (ferrite+retained austenite) microstructure. For high Mn contents, e.g. higher than 10.5 wt. %, a fully duplex structure might be obtained and for Mn contents below 10.5 wt. % a triplex structure forms. Moreover, by enhanced levels of Mn, a low reheating temperature $T_{RH}$ (e.g. less than 700° C.) and a high amount of retained austenite (20 vol. % or more) can be guaranteed. This high amount of retained austenite fully or partially transforms to martensite during deformation, causing a transformation induced plasticity (TRIP) effect giving rise to a high strain hardening rate (=high elongation and high strength).

When the steel strip is intercritically annealed (using a continuous annealing process step) below a temperature of 700° C., the strip has a high strength and high ductility due to presence of a high amount of retained austenite. During reheating for hot forming also in the intercritical temperature range, below 750° C. or preferably below 700° C., additional Mn partitioning can take place giving higher stability for austenite. However, some redistribution of Mn can occur when the annealing and reheating temperatures are different.

This can lead to in some cases a slightly lower amount of retained austenite after hot forming than after continuous annealing and hot dip galvanizing. However, still high amount of retained austenite (>20 vol. %) for the invention to work is obtained. The martensite, if present, may be slightly tempered, but this phenomenon will contribute to even higher elongation values.

The residual elongation (or the in-service ductility) of the article is preferably 25% or more because of the steel composition and the used strip annealing and blank reheating steps. An intercritical annealing as well as the intercritical reheating step of a medium Mn steel approach is preferably used to obtain a mixed microstructure of ultrafine ferrite (0.5-2.0 μm) and areas of martensite and high retained austenite. Therefore, the high ductility in the final product is obtained.

A preferred Hot dip zinc or zinc alloy coated hot press formed steel article is an automotive component, like a front/rear longitudinal bar or bumper beams, in particular those requiring high energy absorption combined with high strength. Non-limiting examples include B-pillars and structural part of the chassis.

Figure 2:
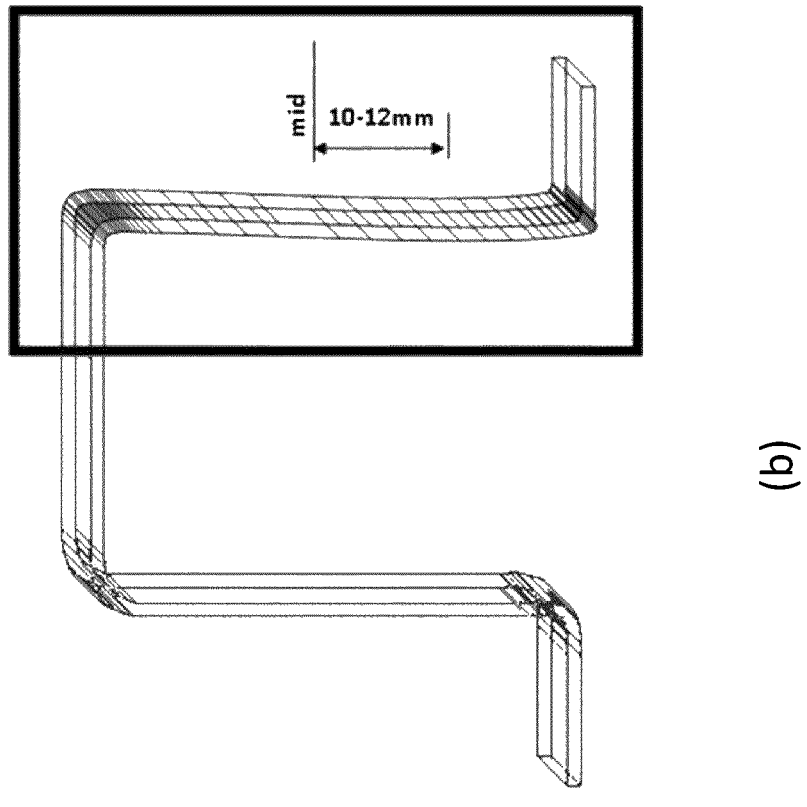
Figure 2:
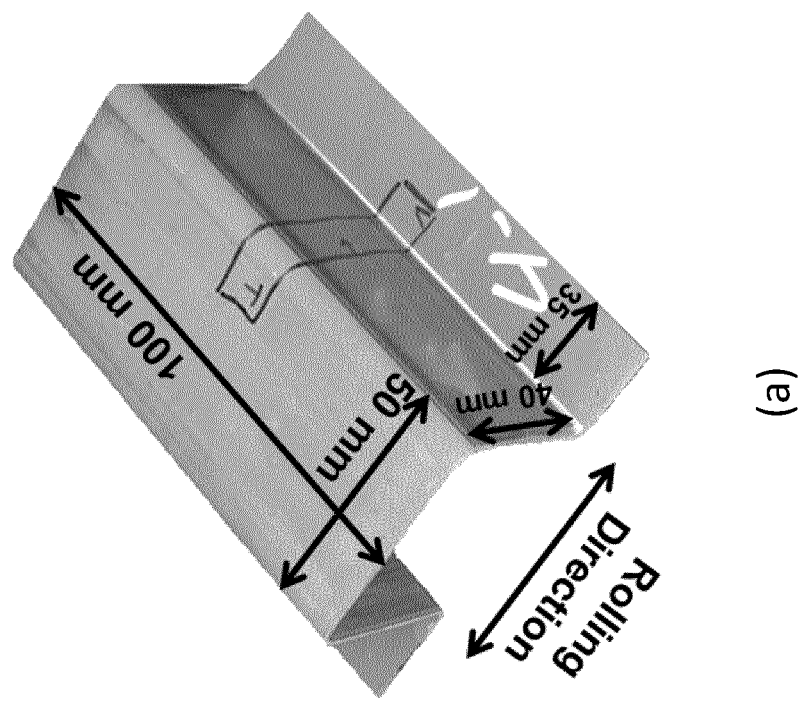

The invention will be elucidated with reference to the examples described below. Reference is made to the drawings in which:

FIG. 1 shows a schematic of the continuous annealing-hot dip galvanizing cycles and the subsequent hot forming cycle FIG. 2 shows sampling for the micro-cracks investigation after hot forming (a) an actual Ω-shaped profile (b) the schematic location.

Steel ingots of the three inventive chemistries A, B and C of dimensions, 200 mm×100 mm×100 mm were cast by melting the charges in a vacuum induction furnace. The chemical compositions of these steels are given in Table 1 along with a conventional 22MnB5 steel grade which is commonly used for hot forming. The 22MnB5 grade was received in GI coated condition at 1.5 mm thickness and was further processed for comparison purposes. The ingots of the inventive steels A, B and C were reheated for 2 hours at 1250° C., and rough-rolled to 25 mm thickness. Then, the strips were reheated again at 1250° C. for 30 minutes, and hot rolled to 3 mm thickness with a finish rolling temperature (FRT) of 900° C. which is in the austenitic phase field for all the three steels. The austenite to ferrite transformation temperature during cooling (Ar3) for the steels A, B and C were measured by dilatometry to be 798, 805 and 725° C. respectively. The hot rolled steels were subjected to coil cooling simulations from 680° C. in a muffle furnace and thus cooled to the room temperature. Then the hot rolled strips were annealed for 96 hours at 600° C. in a muffle furnace under protective atmosphere and air cooled to room temperature. Then the strips were pickled in HCl acid to remove the oxides at 90° C., and cold rolled to 1.5 mm thickness using multiple passes.

The cold rolled strips of steels A were subjected to continuous annealing at 675° C. for 5 minutes, whereas steel B and C at 650° C. for 5 minutes, and then all the steel strips were dipped directly in a galvanizing bath (hot-dip galvanizing) comprising of a Zn-alloy containing mainly Zn and 0.4 wt. % Al. The dimensions of the strips were 200 mm×105 mm×1.5 mm. The bath temperature was maintained at 465° C. and a dipping time of 5 seconds was used and then the strips were cooled to room temperature at 5° C./s which is similar to air cooling. These continuous annealing and hot dip galvanizing simulations were carried out in a hot dip annealing simulator. The atmosphere during soaking of the continuous annealing part of the thermal cycle was set to NH5 gas with dew point of −30° C. and 5 vol. % $H_2$ gas. During heating (i.e. the early part of continuous annealing), the atmosphere was varied with an air-to-fuel ratio (λ) of 0.98, 1.005, 1.01 and 1.02 with a fixed dew point of 20° C. It should be mentioned that when λ>1, the atmosphere is considered to be oxidizing and when λ<1, it is considered to be reducing. A schematic of the continuous annealing-hot dip galvanizing cycle is shown in FIG. 1, together with the subsequent hot press forming operation, and the oxygen contents in the annealing atmosphere during the heating part of continuous annealing for different λ-values are summarised in Table 2.

Then the Zn-coated strips were hot-formed in a hot forming press supplied by Schuler SMG GmbH & Co. KG using the thermal cycles shown in Table 4. The thermal cycles are also shown schematically in the right-hand part of FIG. 1. Two types of tool for forming were used—flat tool for obtaining tensile, bending, contact resistance, corrosion and microstructure specimens, and hat-top tool to obtain omega-shaped profiles for micro-cracking investigation (FIG. 2a). Additional reheating time-temperature combinations were used for contact resistance and corrosion measurements which are given in Table 10 and Table 11 respectively.

The galvanised strips of 30 mm×200 mm (rolling direction×transverse direction) dimensions were subjected to a Zn adhesion test used by automotive industry. In this test, a Betamate 1496V glue was applied (at least 150 mm long, 4-5 mm thick and at least 10 mm wide) on the centre of the strips on both sides of the strip. Then, the glue was cured in an oven at 175° C. for 30 minutes. Then the samples were firmly clamped with the glue side facing outwards and bent with moderate speed to an angle of 90° with a bend radius of 1.1 mm. Then the samples were inspected visually and given a code describing the status of Zn delamination.

Tensile tests were done according to NEN10002 standard at a quasistatic strain rate of $3 \times 10^{-4}$ $s^{-1}$. Tensile specimens with 50 mm gauge length in the rolling direction and 20 mm width were used. Three-point bending tests were done according to VDA 238-100 standard on 40 mm×30 mm×1.5 mm specimens in both longitudinal and transverse directions using 0.4 mm bending radius (=punch radius). Bending angles were converted to 1.0 mm sheet thickness using the formula as mentioned before.

The following are the abbreviations and symbols that have been used in the tables for presenting the tensile and bending tests results. Rp=yield strength, Rm=ultimate tensile strength, Ag=uniform elongation, $A_{50}$=total elongation with 50 mm gauge length. BA=bending angle, L=longitudinal specimen where bending axis is parallel to the rolling direction, T=transversal specimen where bending axis is perpendicular to the rolling direction.

The amount of retained austenite has been determined by X-ray diffraction (XRD) at ¼ thickness location of the samples. The XRD patterns were recorded in the range of 45 to 165° (2 Θ) on a Panalytical Xpert PRO standard powder diffractometer ($CoK_{\alpha}$-radiation). Quantitative determination of phase proportions was performed by Rietveld analysis using Bruker Topas software package for Rietveld refinement. Martensite content was determined from the peak-split at the ferrite diffraction locations in the diffractograms.

The hot formed omega-shaped profiles were investigated for micro-cracking. The dimensions of the omega profiles as well as the scheme of micro-cracks investigation are shown in FIG. 2. From the Ω-profiles, 1 cm wide sections were cut along the height and the specimens were investigated for micro-cracks in the cross sections of the coated sheets using a light optical microscope in a magnification of 1000×. About 1 cm length from the mid-height towards the base of the profiles was examined for the purpose.

Contact resistance of the hot formed blanks of steels B and D for a wide-ranging time and temperature combinations (given in Table 10) was measured following the ISO18594 standard without any sand blasting for obtaining an indication of weldability of the hot formed material. For the same reheating conditions, also corrosion resistance of the coated steels was determined without any sand blasting. Corrosion tests of hot formed steels B and D were conducted as per the VDA 621-415 norm. Each blank was phosphated and e-coated followed by scribing. Parallelly placed wide and narrow scribes (1 mm and 0.3 mm wide and 100 mm long) were marked on the samples in the longitudinal direction. A distance of 30 mm between the two types of scribes and a distance of 35 mm from the edge of the sample were maintained. A solution of 5 vol. % NaCl+10 g NaHCO$_3$ in 150 litre H$_2$O was used as the corrosion medium. The red rust formation (Zn-oxides) on the scribes over several weeks was monitored and the percentage length of a scribe covered with red rust was taken as a measure of corrosion. For both corrosion resistance and contact resistance measurements a non-reheated 22MnB5 steel specimen was also included for comparison purposes.

The Zn alloy coating adhesion test results are given in Table 3. The result where the coating remained intact after the test is indicated by "P" (=pass) and the result where coating delaminated during the test is denoted by "F" (=fail). It can be seen that when λ was 0.98, i.e. no oxygen present in the heating section during continuous annealing (see Table 2), the coating delaminated during the tests for all the three steels A, B and C. On the other hand, when the λ-value was 1.005 and 1.01 corresponding to the oxygen contents in the heating part of 800 and 1700 wt. ppm, all the three coated steels passed the coating adhesion tests. But, when the λ-value was 1.02 (=oxygen content of 3700 wt. ppm in the heating section of continuous annealing), the coating delaminated during the tests in all three steels. These results show that an optimum amount of oxygen content is necessary to be present during heating of continuous annealing of the inventive steel strips to give a good coating adhesion to the steel surfaces. For the case of no oxygen present (λ=0.98), selective oxidation of Mn takes place at the surface of steel which is not possible to reduce back to metallic Mn and therefore the substrate surface will not be amenable to Zn or Zn alloy adhesion during hot dipping. But when too much oxygen of 3700 wt. ppm is present (λ=1.02), too much Fe oxides forming a thick FeO layer on the steel surface. This surface is not amenable to Zn or Zn alloy adhesion. Furthermore, these FeO particles can be picked up on the rolls in the production process giving numerous surface defects. The tensile properties of the steels in their hot-dip galvanised conditions, i.e. before hot forming, are given in Table 5 and the corresponding steel substrate microstructures in Table 6 together with those of as-received GI 22MnB5 grade (steel D). Due to the use of intercritical annealing temperatures for soaking during continuous annealing, high fractions of retained austenite were obtained in all three inventive steels, together with desired amounts of ferrite and small amounts of martensite (Table 6). This was possible due to enrichment of intercritical austenite by Mn and C during annealing which increased the thermal stability of austenite by decreasing its Ms temperature. To the contrary, the 22MnB5 grade which is not modified for any inventive chemical composition and not continuous annealed according to the goal of austenite stabilisation has a ferritic-pearlitic microstructure, without containing any retained austenite. The effects of the specific microstructures obtained in inventive steels A, B and C are reflected in their mechanical properties (Table 5). These steels have much higher yield strength and tensile strength values, together with good total elongation due to the enhanced strain hardening rate achieved from the TRIP effect of retained austenite. This benefit is also reflected in the higher Rm×A50 values of the inventive steels which are indicators of energy absorption capacity of the steels.

The mechanical properties after hot press forming and the corresponding microstructural components of all the steels are presented in Table 7 and Table 8 respectively. It is observed that in the inventive steels in all the reheating conditions over 30 vol. % of retained austenite was achieved in their microstructures due to Mn (and C) partitioning into austenite during intercritical reheating. In steel B with increasing reheating time, the retained austenite content increased for any particular reheating temperature due to more Mn partitioning into austenite. Generally, with higher reheating temperature the retained austenite content slightly decreased due to lesser Mn partitioning into austenite (which can also be shown by ThermoCalc calculations). In general, the retained austenite contents in steels A, B and C are similar or slightly higher after hot forming than before hot forming (Table 6 and Table 8). Therefore, it might be apparent that not much benefit occurred due to further Mn partitioning during hot forming. But this is not true which will be clear from the comparison of the corresponding total elongation, tensile strength and the product of total elongation and tensile strength (Table 5 and Table 7) as will be done shortly. In contrast to the >30 vol. % retained austenite in the inventive steels, the conventional 22MnB5 grade yielded a predominantly martensitic (98.3 vol. %) microstructure after hot forming. The ferrite fractions in the inventive steels are more than 40 vol. % and the martensite fractions are less than 20 vol. %.

As a result of the desired microstructures that formed in the inventive steels, attractive mechanical properties were obtained (Table 7). Higher than 20% total elongation, higher than 800 MPa yield strength and higher than 950 MPa ultimate tensile strength were achieved in the inventive steels. The steel containing higher amount of Mn (steel C) also achieved higher ultimate tensile strength and total elongation values than the lower Mn-containing steels (steels A and B) due to higher amounts of retained austenite. The energy absorption values (Rm×A50 values) in the inventive steels after hot forming are also unusually high. The conventional 22MnB5 grade which achieved a tensile strength above 1500 MPa but due to poor total elongation has much lower energy absorption capacity. The energy absorption capacities of the inventive steels in all the reheating conditions are at least 2.5 times higher than that of the 22MnB5 grade. Also, the bending angles at 1.0 mm thickness of the inventive hot formed steels are much higher than that of 22MnB5. Steels A, B and C achieved minimum bending angles above 100°. As has been mentioned, these spectacular mechanical properties of the inventive steels are due to the high fractions of retained austenite phase in their microstructures that gives high work hardening due to TRIP effect. The additional Mn enrichment in austenite during reheating is reflected in the higher energy absorption values of the hot formed inventive steels than in hot-dip galvanised steels.

The results of micro-crack investigation are provided in Table 9. Micro-cracks of small number and small length were present after hot forming the inventive steels at low temperatures. But the GI 22MnB5 grade conventionally hot formed at higher temperature showed large numbers of long micro-cracks on its surface. This minimisation of micro-cracking in the inventive steels is due to low temperature reheating and hot forming that minimises diffusion and penetration of zinc into the steel grain boundaries prohibiting metal embrittlement during hot forming. However, for 22MnB5 due to the use of higher temperatures the same benefits are not obtained.

The results of contact resistance measurements are given in Table 10. It is observed that when the reheating temperature of an inventive steel (steel B) is up to 700° C. for various soaking times up to 15 minutes, the contact resistance values are low, comparable to as-dipped GI 22MnB5 (steel D) and much lower than GI 22MnB5 reheated at higher temperatures (800-900° C.). It is to be mentioned that as-dipped GI 22MnB5 is weldable and therefore the low contact resistance values of the inventive steels after hot forming suggest that this steel is also weldable. However, the contact resistance value of steel B increases for reheating at 800° C. indicating oxidation of Zn or Zn alloy coating. This will affect the spot-weldability of the hot formed components, and therefore from weldability point of view the reheating temperature should be limited to 700° C. or lower.

Similar trends of corrosion results were observed which are presented in Table 11. The red rust formation slowly increased with reheating temperature in the inventive steel B up to 700° C. and then abruptly increases for reheating temperature of 800° C. Up to 700° C., the red rust percentage is low, albeit slightly higher than the red rust percentage of as-dipped GI 22MnB5, indicating good corrosion resistance of the hot formed product. The corrosion resistance is much higher than the GI 22MnB5 (steel D) when hot formed at 900° C. Therefore, these results suggest that the inventive steel has higher corrosion resistance due its Zn or Zn alloy coating when reheating temperature is limited to 700° C. Severe oxidation of Zn-based coating at 800° C. caused sharp decrease in corrosion resistance.

TABLE 2

Annealing atmospheres used for steels A, B and C

| | Heating Section | | Soaking Section | |
|---|---|---|---|---|
| $\lambda$-value | Oxygen content (ppm) | Dew point (° C.) | Hydrogen content (vol. %) | Dew point (° C.) |
| 0.98 | 0 | 20 | 5 | −30 |
| 1.005 | 800 | 20 | 5 | −30 |
| 1.01 | 1700 | 20 | 5 | −30 |
| 1.02 | 3700 | 20 | 5 | −30 |

TABLE 3

Results of Zn-adhesion test

| $\lambda$-value in the Heating Section | Steel A | Steel B | Steel C |
|---|---|---|---|
| 0.98 | F | F | F |
| 1.005 | P | P | P |
| 1.01 | P | P | P |
| 1.02 | F | F | F |

(F = fail, P = pass)

TABLE 4

Reheating time and temperatures

| Steel | Reheating Temperature (° C.) | Reheating Time (s) |
|---|---|---|
| A | 650 | 180 |
| B | 530 | 300 |
| | 530 | 900 |
| | 620 | 300 |
| | 620 | 900 |
| | 675 | 300 |
| | 675 | 900 |
| C | 650 | 300 |
| D | 700 | 300 |
| | 900 | 300 |

TABLE 1

Composition of the steel in wt. %

| Steel | C | Mn | Si | Al | P | S | B | Cr | Mo | Ni | Cu |
|---|---|---|---|---|---|---|---|---|---|---|---|
| A | 0.155 | 7.4 | 0.20 | 1.99 | 0.0012 | 0.0015 | 0.0001 | 0.004 | 0.001 | 0.004 | 0.03 |
| B | 0.13 | 6.9 | 0.20 | 2.02 | 0.0010 | 0.0018 | 0.0002 | 0.004 | 0.001 | 0.002 | 0.03 |
| C | 0.14 | 10.1 | 0.18 | 1.7 | 0.00010 | 0.004 | 0.0001 | 0.024 | 0.001 | 0.014 | 0.02 |
| D | 0.23 | 1.24 | 0.02 | 0.03 | 0.002 | 0.0008 | 0.003 | 0.01 | 0.001 | 0.001 | 0.03 |

| Steel continued | Nb | Ti | V | W | N | Sn | Co | Fe | Remark |
|---|---|---|---|---|---|---|---|---|---|
| A | 0.0009 | 0.001 | 0.0015 | 0.002 | 0.006 | 0.0010 | 0.001 | Bal. | Invention |
| B | 0.0008 | 0.001 | 0.0013 | 0.001 | 0.004 | 0.0008 | 0.001 | Bal. | Invention |
| C | 0.0005 | 0.002 | 0.0014 | 0.001 | 0.006 | 0.0007 | 0.001 | Bal. | Invention |
| D | 0.0007 | 0.001 | 0.0015 | 0.001 | 0.005 | 0.0007 | 0.0002 | Bal. | Reference |

TABLE 5

Mechanical properties of the Zn-coated blanks before hot forming

| Steel | Annealing Temperature (° C.) | $R_p$ (MPa) | $R_m$ (MPa) | $A_g$ (%) | $A_{50}$ (%) | $R_m \times A_{50}$ (MPa · %) |
|---|---|---|---|---|---|---|
| A | 650 | 939 | 959 | 20.1 | 23.4 | 22440.6 |
| B | 675 | 970 | 997 | 9.5 | 15.1 | 15054.7 |
| C | 650 | 1065 | 1166 | 13.5 | 14.3 | 16673.8 |
| D | 750 | 380 | 661 | 15.1 | 19.8 | 13087.8 |

TABLE 6

Microstructural components of the Zn-coated blanks before hot forming

| Steel | Retained Austenite (vol. %) | Ferrite (vol. %) | Martensite (vol. %) | Pearlite (vol. %) |
|---|---|---|---|---|
| A | 38.3 | 44.9 | 16.8 | 0 |
| B | 35.2 | 51.3 | 14.5 | 0 |
| C | 52.1 | 43.1 | 4.8 | 0 |
| D | 0 | 62.9 | 0 | 37.1 |

TABLE 7

Mechanical properties of the steels after hot press forming

| Steel | Reheating Temperature (° C.) | Reheating Time (s) | $R_p$ (MPa) | $R_m$ (MPa) | $A_g$ (%) | $A_{50}$ (%) | $R_m \times A_{50}$ (MPa · %) | BA-L @ 1 mm thickness (°) | BA-T @ 1 mm thickness, (°) |
|---|---|---|---|---|---|---|---|---|---|
| A | 675 | 180 | 868 | 979 | 23.5 | 25.5 | 24964.5 | 105 | 129 |
| B | 530 | 300 | 905 | 1021 | 22.7 | 24.1 | 24606.1 | 117 | 137 |
|   |   | 900 | 889 | 1015 | 23.5 | 25.7 | 26085.5 | 129 | 145 |
|   | 620 | 300 | 873 | 1003 | 21.9 | 24.3 | 24372.9 | 111 | 125 |
|   |   | 900 | 867 | 1007 | 23.9 | 25.3 | 25477.1 | 124 | 151 |
|   | 675 | 300 | 906 | 1025 | 22.3 | 23.9 | 24497.5 | 107 | 126 |
|   |   | 900 | 901 | 1032 | 21.8 | 24.3 | 25077.6 | 123 | 141 |
| C | 650 | 300 | 1050 | 1150 | 42.1 | 45.3 | 52095 | 106 | 115 |
|   | 700 | 300 | 810 | 1373 | 25.1 | 27.2 | 37345.6 | 100 | 117 |
| D | 900 | 300 | 988 | 1550 | 3.9 | 6.1 | 9455 | 73 | 79 |

TABLE 8

Microstructural components of the steels after hot forming

| Steel | Reheating Temperature (° C.) | Reheating Time (s) | Retained Austenite (vol. %) | Ferrite (vol. %) | Martensite (vol. %) |
|---|---|---|---|---|---|
| A | 675 | 180 | 37.1 | 45.3 | 13.6 |
| B | 530 | 300 | 34.2 | 53.1 | 12.7 |
|   |   | 900 | 36.9 | 52.9 | 10.2 |
|   | 620 | 300 | 32.5 | 54.1 | 13.4 |
|   |   | 900 | 35.0 | 53.9 | 11.1 |
|   | 675 | 300 | 30.1 | 52.8 | 17.1 |
|   |   | 900 | 33.3 | 51.5 | 15.2 |
| C | 650 | 300 | 53.1 | 45.3 | 1.6 |
|   | 700 | 300 | 49.3 | 44.6 | 6.1 |
| D | 900 | 300 | 0 | 1.7 | 98.3 |

TABLE 9

Analysis results of micro-cracks after hot forming

| Steel | Reheating Temperature (° C.) | Reheating Time (s) | Number of cracks | Maximum length of cracks (μm) |
|---|---|---|---|---|
| A | 675 | 180 | 0 | N.A. |
| B | 530 | 300 | 0 | N.A. |
|   |   | 900 | 0 | N.A. |
|   | 620 | 300 | 0 | N.A. |
|   |   | 900 | 2 | 3.0 |
|   | 675 | 300 | 1 | 2.8 |
|   |   | 900 | 5 | 4.6 |
| C | 650 | 300 | 0 | N.A. |
|   | 700 | 300 | 0 | N.A. |
| D | 900 | 300 | 30 | 27.1 |

TABLE 10

Contact resistance results

| Steel | Reheating Temperature (° C.) | Reheating Time (s) | Resistance (mΩ) |
|---|---|---|---|
| B | 400 | 600 | 0.112 |
|   | 500 | 240 | 0.122 |
|   |   | 360 | 0.095 |
|   |   | 480 | 0.087 |
|   | 530 | 300 | 0.086 |
|   |   | 900 | 0.087 |
|   | 600 | 180 | 0.094 |
|   |   | 300 | 0.084 |
|   |   | 420 | 0.121 |
|   | 620 | 300 | 0.091 |
|   |   | 900 | 0.090 |
|   | 675 | 300 | 0.093 |
|   |   | 900 | 0.093 |
|   | 700 | 180 | 0.161 |
|   |   | 300 | 0.164 |
|   |   | 420 | 0.179 |
|   | 800 | 180 | 0.475 |
|   |   | 300 | 1.861 |
|   |   | 420 | 2.987 |
| D | 900 | 180 | 3.102 |
|   | 20 | No reheating | 0.125 |

TABLE 11

Corrosion test results after 1 week of test

| Steel | Reheating Temperature (° C.) | Reheating Time (s) | Red Rust (%) |
|---|---|---|---|
| B | 400 | 600 | 25 |
|   | 500 | 240 | 25 |
|   |     | 360 | 25 |
|   |     | 480 | 25 |
|   | 530 | 300 | 30 |
|   |     | 900 | 35 |
|   | 600 | 180 | 40 |
|   |     | 300 | 40 |
|   |     | 420 | 40 |
|   | 620 | 300 | 40 |
|   |     | 900 | 40 |
|   | 675 | 300 | 45 |
|   |     | 900 | 45 |
|   | 700 | 180 | 45 |
|   |     | 300 | 45 |
|   |     | 420 | 45 |
|   | 800 | 180 | 100 |
|   |     | 300 | 95 |
|   |     | 420 | 98 |
| D | 900 | 180 | 95 |
|   | 20  | No reheating | 25 |

The invention claimed is:

1. A method of hot press forming a hot dip zinc or zinc alloy coated steel strip from a zinc or zinc alloy coated steel strip, wherein the steel strip has a composition in wt. %:
C: 0.05-0.3;
Mn: 3.0-12.0;
Al: 0.04-3.0;
optionally one or more further alloying elements:
Si: less than 1.5;
Cr: less than 2.0;
V: less than 0.1;
Nb: less than 0.1;
Ti: less than 0.1;
Mo: less than 0.5;
inevitable impurities;
the remainder being Fe;
the method of making the steel strip comprising the steps of:
casting a molten steel into a slab;
reheating the slab to a temperature above 1150° C. and holding it at said temperature for a time of 60 minutes or more;
hot rolling the slab into a strip;
coiling the hot rolled steel strip;
pickling the hot rolled steel strip;
optionally cold rolling the pickled hot rolled steel strip into a cold rolled steel strip wherein in the case of cold rolling, the hot rolled strip after coiling and pickling is subjected to batch annealing at a temperature TB for a period PB, TB and PB being chosen such that the steel has a microstructure exhibiting more than 60 vol. % ferrite after cooling to room temperature;
continuous annealing the strip according to an annealing heat cycle wherein the steel strip temperature is going up, is then remaining at a stable level for soaking in a soaking section wherein a soaking atmosphere is maintained, at a temperature between TMIN and TMAX wherein TMIN=TMAX−100° C., wherein continuous annealing is considered to end at the point in the heating cycle where the steel strip temperature goes down:
wherein TMAX is equal to or less than the lowest of Ac3-100° C. and 700° C.;
wherein the soaking atmosphere has a dew point of −40 to −10° C.;
wherein the continuous annealing comprises in the heating section pre-oxidizing the steel strip in an annealing atmosphere having an oxygen content of 500 to 3000 volume ppm;
wherein the soaking atmosphere is a reducing atmosphere;
wherein the continuous annealing time, which consists of the time in the heating section plus the time in the soaking section is 150 seconds or more;
hot dip coating the steel strip with the zinc or zinc alloy, thereby providing a hot dip zinc or zinc alloy coated steel strip whilst:
using a dipping time of 3 seconds or more;
maintaining in the hot dip bath a bath temperature of 420° C. to 500° C.;
wherein the zinc bath contains essentially zinc, at least 0.1 wt. % Al, and optionally up to 5 wt. % Al and optionally up to 4 wt. % Mg, the rest of the bath comprising further elements all individually less than 0.3 wt. %, and unavoidable impurities;
hot press forming the hot dip zinc or zinc alloy coated steel strip, comprising the steps of:
providing a blank taken from the hot dip zinc or zinc alloy coated steel strip;
reheating the blank to a blank temperature TRH in the range of Ac3-300° C. to 750° C.,
soaking the blank at TRH for a period of longer than 3 minutes and up to 15 minutes;
transferring the blank to the press within 30 seconds;
shaping the hot dip zinc or zinc alloy coated steel strip in the press, thereby cooling the hot dip zinc or zinc alloy coated steel strip;
removing the hot dip zinc or zinc alloy coated steel strip from the press.

2. The method according to claim 1, wherein the Mn content is 6.0 wt. % or more.

3. The method according to claim 1, wherein the slab is reheated to a temperature and held at said temperature for a time period of 120 minutes or more.

4. The method according to claim 1, wherein TRH is in the range of Ac3-300° C. to 700° C.

5. The method according to claim 1, wherein transferring the blank to the press is within 10-15 seconds.

6. The method according to claim 1, wherein in the inevitable impurities, S is less than 30 ppm by weight; and P is less than 0.04 wt. %.

7. The method according to claim 1, wherein the hot dip zinc or zinc alloy coated steel strip has a microstructure comprising in vol. %
ferrite: 40% or more;
retained austenite: 30% or more;
martensite: 0-30%.

8. The method of claim 1, wherein the hot rolling the slab into the strip has an exit finish hot rolling temperature FRT above the Ar3 temperature where Ar3 denotes the temperature at which ferrite transformation begins in the steel during cooling.

9. The method of claim 1, wherein the TB is 650° C. or lower and the PB is 24 hours or longer.

10. The method of claim 1, wherein the steel strip temperature is going up at a rate of 1-15° C./s in the heating section.

11. The method of claim 1, wherein the continuous annealing is considered to end at the point in the heating cycle where the steel strip temperature goes down at a rate of 0.5-10° C./s.

12. The method of claim 1, wherein the reducing atmosphere comprises between 1-15 vol. % Hydrogen in Nitrogen.

13. The method of claim 1, wherein the time in the soaking section is 180 seconds or more.

14. The method according to claim 1, wherein the slab is reheated to a temperature above 1200° C., and held at said temperature for a time of 60 minutes or more.

15. The method of claim 14, wherein the slab is reheated to the temperature above 1250° C.

16. The method according to claim 1, wherein the hot dip zinc or zinc alloy coated steel strip has a microstructure comprising in vol. %
    ferrite: 30% or more;
    retained austenite: 20% or more;
    martensite: 0-40%.

17. The method according to claim 16, wherein the microstructure comprises ferrite in an amount of 40% or more.

18. The method according to claim 16, wherein the microstructure comprises retained austenite in an amount of 30% or more.

19. The method according to claim 16, having the following properties:
    yield strength: 800 MPa or more;
    tensile strength: 820 MPa or more;
    total elongation: 10% or more;
    minimum bending angle at 1.0 mm thickness: 80° or more.

20. The method according to claim 16, wherein the hot dip zinc or zinc alloy coated steel strip comprises a steel substrate provided with a hot dip coated layer, wherein the length of any micro-cracks in the steel substrate is 5 μm or smaller.

21. The method according to claim 16, wherein the hot dip zinc or zinc alloy coated steel strip has the following properties:
    yield strength: 850 MPa or more;
    tensile strength: 820 MPa or more;
    total elongation: 15% or more;
    minimum bending angle at 1.0 mm thickness: 90° or more.

22. The method according to claim 16, wherein the hot dip zinc or zinc alloy coated steel strip has the following properties:
    yield strength: 900 MPa or more;
    tensile strength: 1000 MPa or more;
    total elongation: 25% or more;
    minimum bending angle at 1.0 mm thickness: 90° or more.

* * * * *